United States Patent [19]

Vahabzadeh

[11] Patent Number: 4,710,879

[45] Date of Patent: Dec. 1, 1987

[54] RATIO CONTROL SYSTEM FOR A CONTINUOUSLY VARIABLE TRANSMISSION

[75] Inventor: Hamid Vahabzadeh, Rochester Hills, Mich.

[73] Assignee: General Motors Corporation, Detroit, Mich.

[21] Appl. No.: 828,677

[22] Filed: Feb. 12, 1986

[51] Int. Cl.⁴ .................... B60K 41/12; G06F 15/20
[52] U.S. Cl. .................................. 364/424.1; 74/866; 474/12; 474/18
[58] Field of Search ............... 364/424.1, 161, 162, 364/163; 74/866; 474/18, 12, 70, 71

[56] References Cited

U.S. PATENT DOCUMENTS

| 4,265,263 | 5/1981 | Hobbs | 364/1 |
| 4,509,125 | 4/1985 | Fattic et al. | 364/424.1 |
| 4,637,280 | 1/1987 | Oshiage | 364/424.1 |
| 4,649,488 | 3/1987 | Osanai et al. | 474/18 |
| 4,670,843 | 6/1987 | Matsumura et al. | 364/424.1 |

FOREIGN PATENT DOCUMENTS 0111854 6/1984 European Pat. Off. ......... 364/424.1

Primary Examiner—Parshotam S. Lall
Attorney, Agent, or Firm—Mark A. Navarre

[57] ABSTRACT

The speed ratio of a continuously variable transmission (CVT) is adjusted in relation to the actual ratio $R_a$ and a desired ratio $R_d$ so that the time required to change the ratio by any multiplicative step is substantially the same regardless of the ratio provided by the transmission. The ratio error $E_r$ is defined according to the ratio $R_d/R_a$, and the ratio is adjusted at a rate determined in accordance therewith.

3 Claims, 8 Drawing Figures

RATIO CONTROL SYSTEM FOR A CONTINUOUSLY VARIABLE TRANSMISSION

This invention relates to the control of a continuously variable transmission (CVT), and more particularly to a control system for scheduling the rate of change in ratio.

Continuously variable transmissions are well known in the art and exist in a variety of configurations. Generally, the ratio control systems for such transmissions include a hydraulic or hydromechanical inner servo loop for varying the speed ratio between the transmission input and output shafts according to the position of an adjustable control member. An outer servo loop adjusts the position of the control member so that the transmission ratio is varied in a manner to bring the actual ratio into correspondence with a desired ratio determined in accordance with operator demand.

From a control standpoint, the transmission and inner servo loop comprise a fixed gain inner system with which the outer servo loop must interface to provide ratio control consistent with system constraints and stability and drivability criteria. With most known CVT mechanisms, the gain of the inner system is nonlinear, meaning that the ratio change per unit movement of the adjustable control member varies as a function of the actual ratio.

It has been suggested that the outer servo loop gain should be scheduled so as to compensate for the nonlinearity of the inner system. For example, the gain of the outer servo loop can be scheduled as a nonlinear function of the actual ratio, but in opposite relation to the ratio dependency of the inner system to thereby provide substantially constant overall gain. In such a system, the time response of the ratio control—that is, the change in ratio per unit time—is substantially the same regardless of the actual ratio. A system which provides this type of control over at least a portion of the transmission operating range is set forth in detail in the Fattic et al. U.S. Pat. No. 4,509,125, such patent being assigned to the assignee of the present invention.

This invention is directed to a system wherein the overall time response of the ratio control is such that the time required to change the ratio R by any given factor f is substantially the same, regardless of the ratio R. In other words, it can be said that the time response of the ratio control system is ratiometrically linear. This effect is achieved through a novel definition of ratio error and the corresponding positioning of the transmission adjustable control member.

According to this invention, the error $E_r$ of the actual ratio $R_a$ with respect to the desired ratio $R_d$ is defined according to the expression:

$$E_r = R_d/R_a$$

The error $E_r$ is corrected over an interval of n control member adjustments. A ratio command $R_{cmd}$ is computed for each of the n adjustments, the ratio command being determined in accordance with the product of the actual ratio $R_a$ and a ratio step factor $R_s$ as follows:

$$R_{cmd} = R_a * R_{sj}$$

where $R_s$ is defined according to the expression:

$$R_s = (E_r)^{1/n}$$

The ratio error and associated control terms are easily mechanized with a computer based controller to provide a novel outer loop control method which achieves ratiometrically linear control of the transmission speed ratio.

IN THE DRAWINGS

Figure 1:
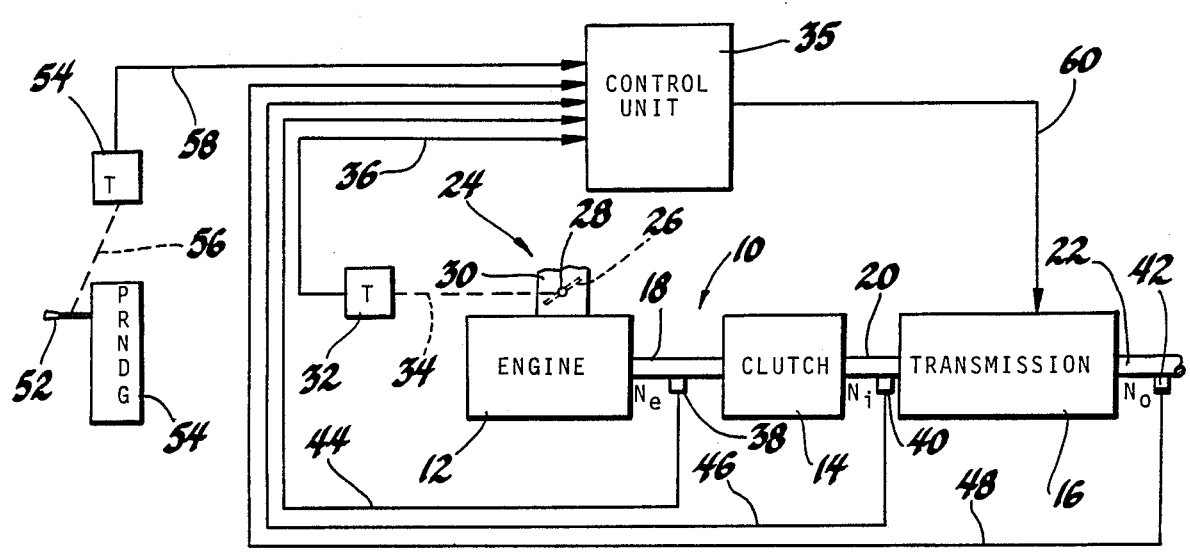
FIG. 1 is a block diagram of a motor vehicle drive train including a CVT, and a computer based control unit for implementing the ratio control system of this invention.

Referring now to the drawings, and more particularly to FIG. 1, reference numeral 10 generally designates a motor vehicle drive train comprising engine 12, a forward and reverse clutch mechanism 14 and a continuously variable ratio transmission 16. The engine output shaft 18 drives transmission input shaft 20 through clutch mechanism 14 and transmission output shaft 22 is connected to a differential or the driving wheels of a vehicle (not shown) in a conventional manner.

Reference numeral 24 generally designates an engine throttle comprising a butterfly valve 26 pivoted about pin 28 within housing 30 for controlling the power output of engine 12. Throttle 24 may be controlled in a conventional manner as by an accelerator pedal (not shown) through a suitable linkage mechanism (also not shown). A transducer 32, such as a rotary potentiometer is responsive to the position of throttle 24 as indicated by dashed lines 34, and the output of transducer 32 which is indicative of the throttle position is applied as an input to a control unit 35 via line 36.

Transducers 38, 40 and 42 are responsive to the rotary speed of shafts 18, 20 and 22, respectively, the outputs of such transducers being connected as inputs to control unit 35 via lines 44, 46 and 48. Transducers 38, 40 and 42 each may be a conventional device such as a variable reluctance magnetic speed pick-up wherein a magnetic circuit intermittently cooperates with the teeth of a wheel or gear connected to the respective shaft for rotation therewith. The output of transducer 38 is thus indicative of the speed of shaft 18 and such speed is designated as $N_e$. The output of transducer 40 is indicative of the speed of shaft 20 and such speed is designated by $N_i$. The output of transducer 42 is indicative of the speed of shaft 22 and such speed is designated by $N_o$.

Reference numeral 50 designates a manually operated gear range selector in the passenger compartment of the vehicle, including a control lever 52 movable to one of the five designated positions. The positions of range selector 50 are similar to those found in conventional motor vehicles, the position "P" representing Park, the position "R" representing Reverse, the position "N" representing Neutral, the position "D" representing Drive and the position "G" representing Grade—a forward drive range requiring high output torque.

Transducer 54 is responsive to the movement of control lever 52 as indicated by dashed line 56 and develops an output signal indicative of the range position to which control lever 52 is pointed. Such output is connected as an input to control unit 35 via line 58.

Control unit 35 is operative in response to each of the above-mentioned inputs generate an output signal on line 60 for controlling the position of an adjustable ratio control member in transmission 16. The control unit 35 may also perform other functions such as fluid pressure control and clutch control, if desired. For simplicity, however, the controls for such other functions are not described herein.

Figure 2:
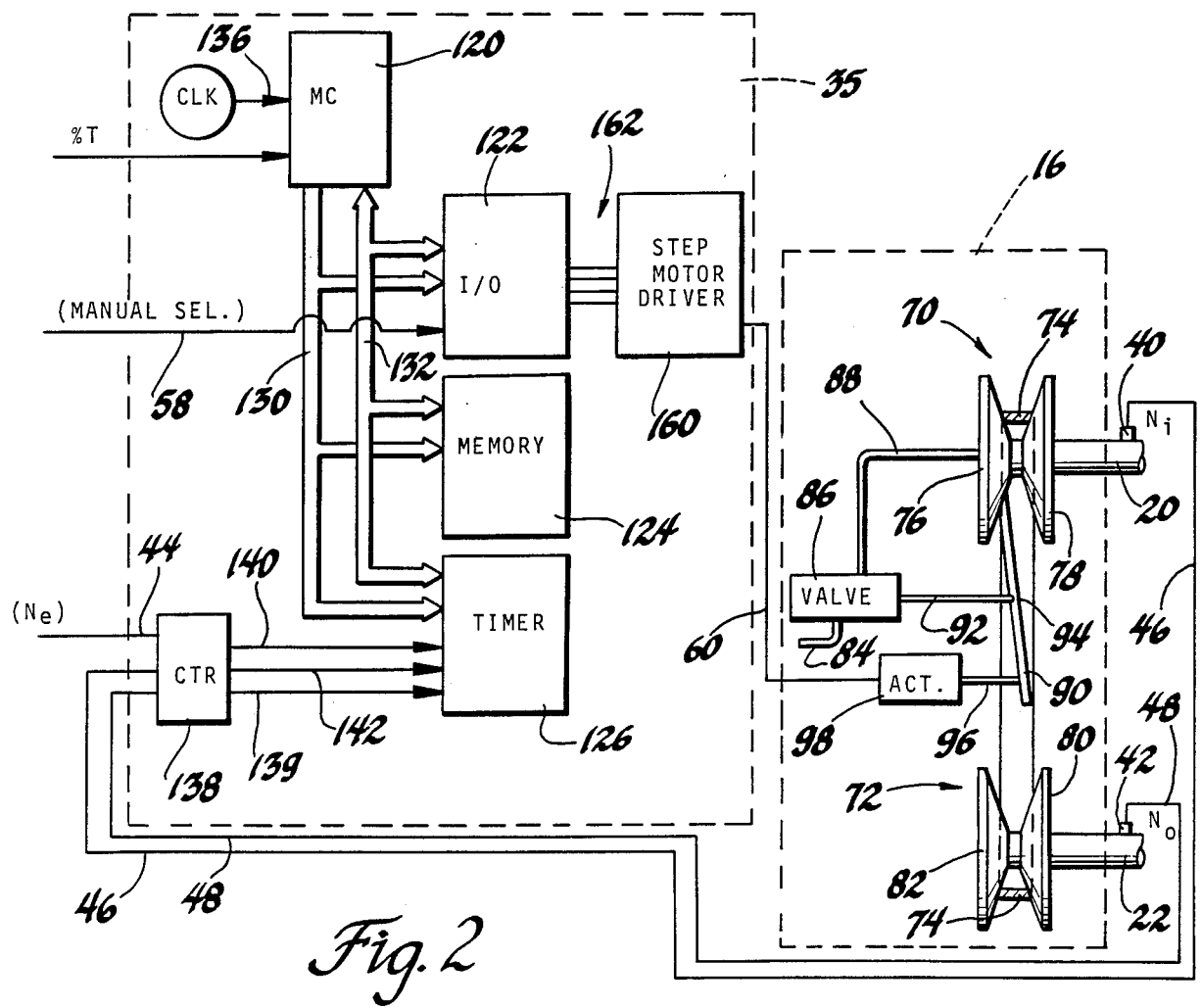
FIG. 2 is a more detailed diagram of the CVT and control unit depicted in FIG. 1.

In FIG. 2, transmission 16 and control unit 35 are shown in somewhat more detail. The various lines and devices depicted in FIGS. 1 and 2 have been assigned corresponding reference numerals. Thus, the control unit output line 60 is applied to transmission 16, and the speed signals $N_e$, $N_i$ and $N_o$, the throttle signal, and the manual range selector signal are applied to control unit 35 via lines 44, 46, 48, 36 and 58, respectively. For simplicity, engine 12, shaft 18 and transducers 32, 38 and 54 are not shown.

Transmission 16 comprises an input pulley, designated generally by reference numeral 70, connected to transmission input shaft 20 for rotation therewith, and an output pulley, designated generally by reference numeral 72 connected to transmission output shaft 22 for rotation therewith. A V-belt 74 is supported on the inner conical surfaces of pulleys 70 and 72. The pulley half 76 of input pulley 70 is axially movable relative to the pulley half 78, and the pulley half 80 of output pulley 72 is axially movable relative to the pulley half 82.

A regulated control pressure derived from a fluid pressure source (not shown) urges pulley half 80 toward pulley half 82, and a further higher control pressure in line 84 is applied through valve 86 and the line 88 to a piston mechanism (not shown) in input pulley 70 for moving pulley half 76 relative to pulley half 78. Movement of pulley half 76 relative to pulley half 78 in response to the control pressure in line 88 increases or decreases the effective diameter of input pulley 70, and such movement brings about a complementary movement of pulley half 80 with respect to pulley half 82 to decrease or increase the effective diameter of output pulley 72. V-belt 74 is supported at the effective diameter of input pulley 70 and output pulley 72. In this way, the movement of pulley half 76 with respect to pulley half 78 is controlled to vary the speed ratio between transmission input shaft 20 and transmission output shaft 22 in a continuous or stepless manner.

Lever 90 is pivotally mounted on valve rod 92 at point 94. One end of lever 90 rests against the inner conical surface of pulley half 76 while the other end of lever 90 rests against shaft 96 of linear actuator 98. Valve rod 92 is depicted in the null or steady state position. Movement of valve rod 92 from the null position, due to movement of either pulley half 76 or actuator shaft 96, causes valve 86 to alter the pressure in line 88 in a manner to move pulley half 76 for restoring valve rod 92 to the null position.

In view of the above, it will be understood that the speed ratio between transmission output shaft 22 and transmission input shaft 20 ($N_o/N_i$) may be changed in a stepless manner over a range of ratios defined by the diameters of pulleys 70 and 72 as determined by linear actuator 98 which is energized via line 60 to adjust the lineal position of shaft 96. For the purposes of this description, it will be assumed that linear actuator 98 is a conventional step motor having lineal output shaft movement.

A more detailed description of the transmission ratio control mechanism described above is given in U.S. Pat. No. 4,403,974 issued Sept. 13, 1983, and assigned to the assignee of the present invention.

In the illustrated embodiment, control unit 35 is a microcomputer-based, and comprises Microcomputer (uC) 120, Input/Output unit (I/O) 122, Memory unit 124, and Timer 126. Microcomputer 120 communicates with the above units in a conventional manner via Address and Control bus 130 and bi-directional Data bus 132. Clock 134 provides a high frequency clock pulse train to MPU 120 via line 136 for timing the operation and interaction for the various units. Each of the elements including uC 120 may be any of a number of known commercially available devices.

Analog inputs such as the throttle signal on line 36, are applied to an analog input port of UC 120, and digital inputs such as manual selector signal on line 58, are applied as inputs to I/O unit 122. The speed signals on lines 44, 46 and 48 are each applied in a conventional manner as an input to a counter, each such counter being included within the counter block designated by reference numeral 138. The outputs of the counters in counter block 138 are applied as inputs to Timer 126 via lines 139, 140 and 142, and Timer 126 generates therefrom digital signals representative of the rotational speeds of the respective drivetrain shafts.

The output commands for linear actuator 98 is applied to driver circuit 160 via the lines generally designated by reference numeral 162. Driver 160 may be a conventional step motor translator or driver and operates in a manner to energize the actuator 98 via line 60 in accordance with the actuator position commands on lines 162.

It will be understood that the ratio adjustment elements described above form but one mechanism by which a ratio command may be carried out, and that this invention is not limited thereto. Alternatively, for example, the position of the pulley half 76 could be sensed electronically, and used to generate a pilot or control pressure for controlling the operation of the valve 86. In such case, the electronic control element would take the form of a solenoid operated servo valve and the controller would energize the solenoid at the level required to bring the actual speed ratio into correspondence with the ratio command generated by the control unit 35.

Figure 3:
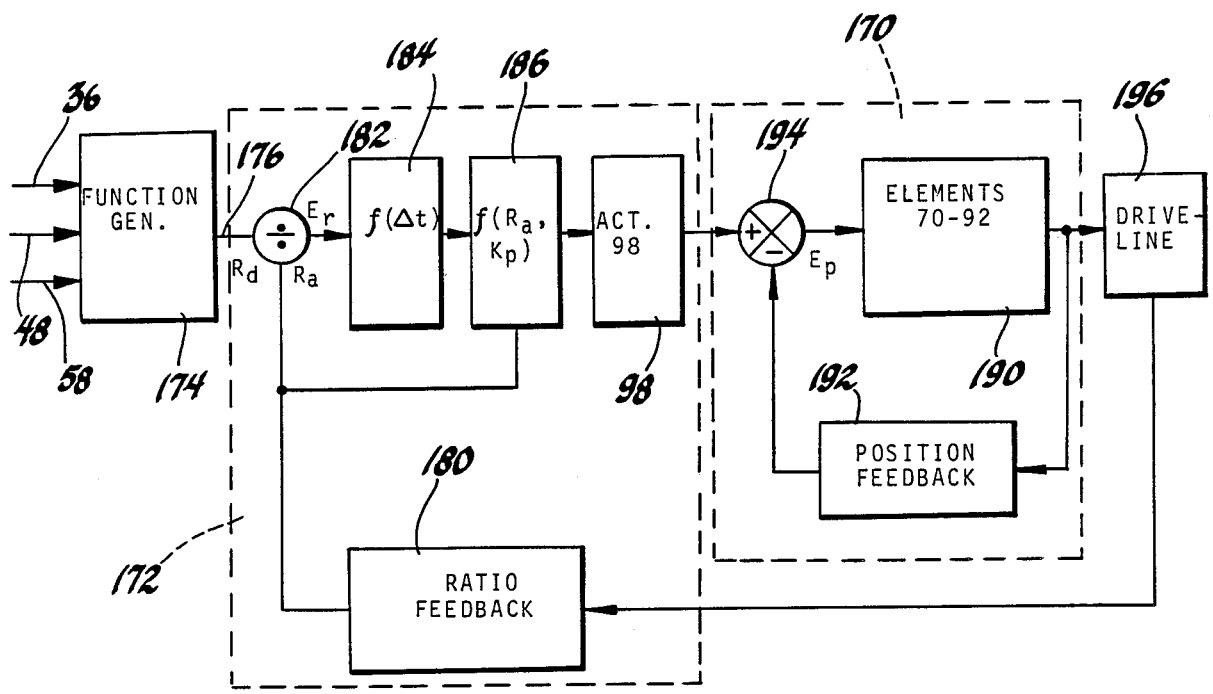
FIG. 3 is a control system diagram for the ratio control system of this invention.

FIG. 3 is control system diagram for control unit 35 and the ratio control elements of transmission 16, illustrating the elements comprising the inner and outer servo loops. It will be understood that this diagram is a schematic representation of the system shown in FIGS. 1 and 2. The inner servo loop is designated by reference numeral 170 and the outer servo loop is designated by reference numeral 172.

A function generator 174 generates a desired speed ratio $R_d$ for transmission 16 on line 176 according to the parameters of throttle position on line 36, transmission output speed on line 48 and manual selector position on line 58. Such function is implemented by uC 120 via a look-up table or other conventional function generating mechanism.

The outer servo loop 172 essentially comprises: the linear actuator 98 and its driver, a ratio feedback designated by reference numeral 180 for determining the actual speed ratio $R_a$ according to the expression $N_o/N_i$, a division junction 182 for dividing the desired speed ratio $R_d$ by the actual speed ratio $R_a$ to form a speed ratio error signal $E_r$, and the function blocks 184–186 for developing a drive signal for linear actuator 98 in accordance with the error signal $E_r$ and the actual speed ratio $R_a$. Blocks 180–186 are thus implemented by control unit 35, and block 98 is physically included in transmission 16.

Inner loop 170 essentially comprises: transmission ratio control elements as indicated at block 190 including valves 86 and the piston mechanism referred to in reference to FIG. 2, position feedback elements, as indicated at block 192 including lever 90 for mechanically indicating the position of pulley half 76, and summing junction elements, as indicated at block 194 including valve rod 92 for determining the position error $E_p$ between the actual position of pulley half 76 and a position corresponding to the lineal shaft position of actuator 98. Thus, each of the inner servo loop elements are contained within the transmission 16. The transmission driveline elements are directly controlled by inner servo loop 170. Such elements are indicated at block 196 and include shafts 20 and 22, pulleys 70 and 72 and V-belts 74.

The inner and outer servo loops 170 and 172 operate together to establish a transmission speed ratio that corresponds to the desired speed ratio determined by function generator 74. The inner servo loop 170 controls the transmission elements 70–92 to establish a transmission speed ratio corresponding to the lineal position of actuator output shaft 96. Accordingly, the gain of inner servo loop 170 may be expressed in terms of the change in speed ratio per unit change in actuator shaft position—ratio/inch, for example. Such gain is not easily modified, and as will be described in reference to FIG. 4, is typically a nonconstant function of the actual speed ratio $R_a$.

The outer servo loop 172 controls actuator 98 to establish an actuator output shaft position corresponding to the desired speed ratio. The outer servo loop 172 controls not only the direction of lineal movement of the actuator shaft 96, but also its rate of change of movement with respect to time. The direction of movement is determined strictly according to whether the actual ratio is above or below the desired speed ratio while the rate of change of movement is varied as described herein.

Figure 4:
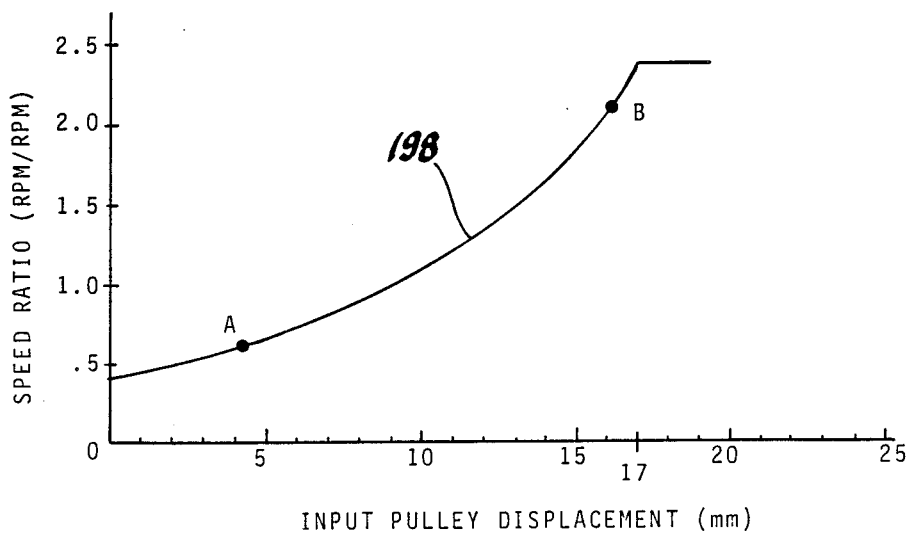
FIG. 4 is a graph transmission speed ratio as a function of the actuator position.

The trace 198 of FIG. 4 depicts an empirically determined relation between the speed ratio $(N_o/N_i)$ of transmission 16 and the lineal position of the input pulley half 76. The travel or position of the pulley half shaft 96 is given in millimeters. The change in speed ratio for a given displacement of the pulley half 76 represents the gain of the inner servo loop 170 and is given by the slope of curve 198. As seen in the graph, the gain of the inner servo loop 170 is significantly lower at relatively low speed ratios (as at point A) than at relatively high speed ratios (as at point B). Such variation of inner loop gain with speed ratio results from CVT geometry and is felt to be characteristic of nearly all known CVT mechanisms.

Figure 5:
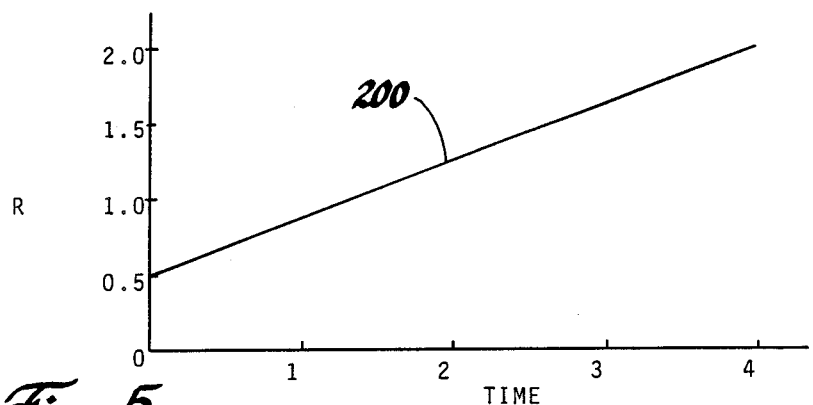
FIG. 5 is a graph depicting the system time response obtained with a previously known ratio control system.

As indicated above, it has been suggested in the prior art (as in the U.S. Pat. No. 4,509,125) that the outer servo loop gain should be tailored in relation to the inner servo loop gain to provide a system time response wherein the change in ratio per unit time is substantially constant regardless of the speed ratio. In other words, the rate of change of ratio with respect to time is substantially constant. This characteristic is graphically depicted by the trace 200 in FIG. 5. In such Figure, the speed ratio $N_o/N_i$ is illustrated as being variable between 0.5:1, a maximum underdrive ratio, and 2.0:1, a maximum overdrive ratio. The time divisions are arbitrary.

With a system of the type depicted by the trace 200, the time required to change the ratio by a given factor depends on the ratio. More particularly, it can be seen that it takes much longer to change the ratio by a given factor when the transmission is operating in an overdrive condition ($R_a$ greater than 1:1) than when the transmission is operating in an underdrive condition ($R_a$ less than 1:1). For example, shifting the ratio from the symmetry point of 1:1 to an overdrive ratio of 2.0:1 (a factor of two) would take about 2.7 time divisions. Shifting the ratio from 1:1 to the underdrive ratio of 0.5:1 (also a factor of two) would take about 1.3 time divisions.

Figure 6:
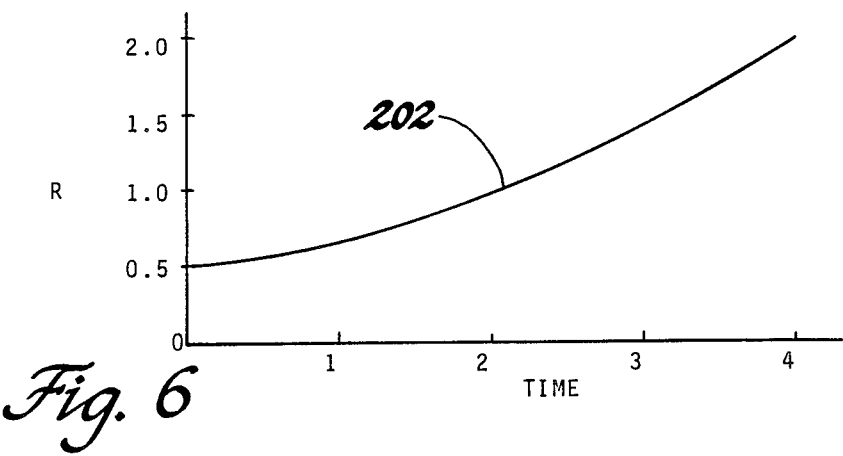
FIGS. 6 and 7 are graphs depicting the system time response of a ratio control system according to this invention.
Figure 7:
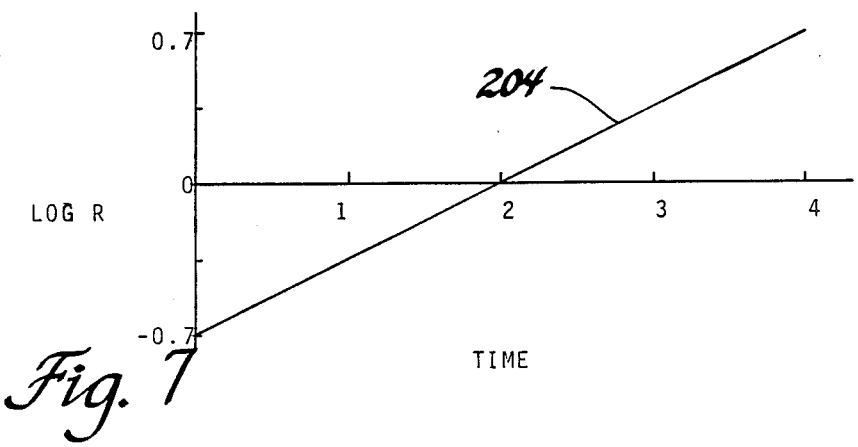

In contrast to the system described above, this invention provides a system in which the time required to change the ratio by a given factor is substantially constant regardless of the ratio or the factor, as graphically depicted by the traces 202 and 204 of FIGS. 6 and 7, respectively. FIG. 6 depicts speed ratio $N_o/N_i$ on the vertical axis; FIG. 7 depictes log $(N_o/N_i)$ on the vertical axis. Referring to FIG. 6, it will be seen that substantially the same time (about 2 time divisions) is required to shift from the symmetry point of 1:1 to either the underdrive ratio of 0.5:1 or the overdrive ratio of 2.0:1. This relation holds true for other ratio changes as well.

According to this invention, a system having the characteristic depicted in FIGS. 6 and 7 is achieved through a control method which employs a novel definition of ratio error and a corresponding novel method of generating the desired corrective position for the adjustable control member 96. Whereas the ratio error $E_r$ is conventionally defined according to the difference between actual and desired ratios $R_a$ and $R_d$, the present invention defines the ratio error $E_r$ according to the ratio $R_d/R_a$. The ratio error $E_r$ thus defines the factor f by which it is desired to change the speed ratio. A ratio error of unity signifies no error, ratio errors greater than unity signify a desire to increase the ratio $R_a$, and ratio errors less than unity signify a desire to decrease the ratio $R_a$.

When a ratio error is indicated, the ratio is corrected by making n successive ratio adjustments via the linear actuator 98. Each such adjustment is made in accordance with a ratio command $R_{cmd}$ which is determined according to the product of the actual ratio $R_a$ and a ratio step factor $R_s$ as algebraically expressed below:

$$R_{cmd} = R_a * R_s$$

the ratio step factor $R_s$ being determined according to the expression:

$$R_s = (E_r)^{1/n}$$

When the ratio control method is carried out with a microcomputer based controller such as the control unit 35, the term n is predetermined in relation to the update frequencies of the desired ratio $R_d$ and the actual ratio $R_a$. In the mechanization of this invention depicted by the flow diagram of FIG. 8, the desired ratio is updated once every 160 mS, and the actual ratio $R_a$ is updated once every 40 mS. In such case, the term n has a value of four. The ratio error $E_r$ is computed at the same frequency as the desired ratio $R_d$, and each computed error $E_r$ is corrected by four adjustments of the linear actuator 98.

Figure 8:
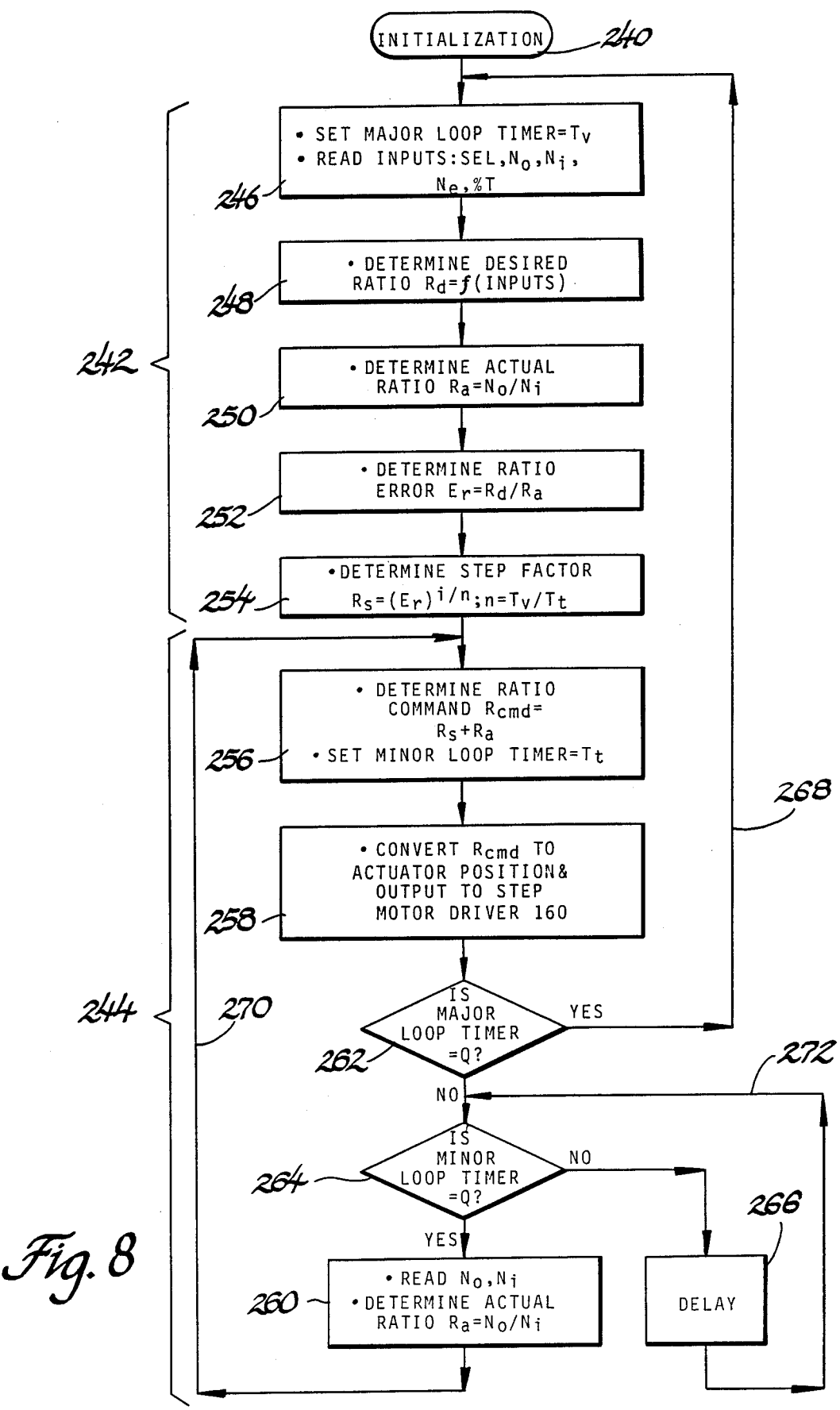
FIG. 8 is a flow diagram for implementing the ratio control system of this invention with the computer based control unit of FIGS. 1-2.

The flow diagram of FIG. 8 is representative of computer program instructions for carrying out the control method of this invention with the microcomputer based control unit 35 depicted in FIGS. 1–2. The flow diagram comprises an initialization routine 240, a major loop 242, and a minor loop 244. The initialization routine 240 is executed at the initiation of each period of vehicle operation for resetting the various memory registers and timers of control unit 35 to predetermined states. The major loop 242 determines the desired speed ratio $R_d$ as a function of various vehicle operating parameters, and is executed every $T_v$ seconds as determined by a MAJOR LOOP TIMER. The minor loop 244 determines and outputs position commands to the step motor driver 160, and is executed every $T_t$ seconds as determined by a MINOR LOOP TIMER.

The major loop 242 essentially comprises the instruction blocks 246–254. The instruction block 246 serves to set the MAJOR LOOP TIMER to $T_v$, and to read the various inputs, including the manual selector signal on line 58, the shaft speed signals on lines 44–48, and the throttle position signal on line 36. The instruction block 248 determines the desired speed ratio $R_d$ as a function of the various input signals as explained above in reference to FIG. 3. Instruction block 250 determines the actual ratio $R_a$ according to the ratio $N_o/N_i$, and instruction block 252 determines the ratio error $E_r$ according to the ratio $R_d/R_a$. The instruction block 254 then determines the ratio step factor $R_s$ according to the expression:

$$R_s = (E_r)^{1/n}$$

where n is the steps over which the error $E_r$ is to be corrected. Algebraically, n can be defined in terms of the terms $T_v$ and $T_t$ as follows:

$$n = T_v/T_t$$

Alternatively, the term n may be defined in terms of the update frequencies $f_v$ and $f_t$ as follows:

$$n = f_t/f_v$$

where $f_t$ is the reciprocal of $T_t$, and $f_v$ is the reciprocal of $T_v$.

The minor loop 244 comprises the instruction blocks 256–260. The instruction block 256 serves to set the MINOR LOOP TIMER to $T_t$, and to determine the ratio command $R_{cmd}$ according to the expression:

$$R_{cmd} = R_s * R_a$$

The instruction block 258 converts the ratio command $R_{cmd}$ to an actuator position command in accordance with the inner loop relation graphically depicted in FIG. 4, and outputs the position command to step motor driver 160 via the I/O device 122 and the lines 162. The instruction block 260 serves to update the actual ratio $R_a$ so that current values of $R_a$ will be used in each execution of the minor loop 244.

The decision blocks 262–264 and the delay instruction block 266 coordinate the execution of the major and minor loops 242 and 244. The decision block 262 determines if the MAJOR LOOP TIMER has timed an interval of $T_v$ seconds or greater. If so, the major loop 242 is reexecuted as indicated by the flow diagram line 268. If not, the instruction block 264 is executed to determine if the MINOR LOOP TIMER has timed an interval of $T_t$ seconds or greater. If so, the minor loop 244 is reexecuted as indicated by the flow diagram line 270. If not, the block 266 is executed to define a pause of predetermined duration, after which the decision block 264 is reexecuted as indicated by the flow diagram line 272.

As indicated above, this invention has been successfully carried out with a major loop interval $T_v$ of 160 mS, and a minor loop interval $T_t$ of 40 mS. In such mechanization, the term n had a value of four, thereby simplifying the computational requirements of the major loop. Moreover, the minor loop performs merely a single multiplication operation to determine the ratio command, thereby simplifying the routine and reducing the microcomputer overhead.

While this invention has been described in reference to the illustrated embodiment, it will be recognized that various modifications will occur to those skilled in the art, and that systems incorporating such modifications may fall within the scope of this invention which is defined by the appended claims.

The embodiments of the invention in which an exclusive property or privilege is claimed are defined as follows:

1. For a vehicle drive train having a continuously variable transmission and an inner servo loop control mechanism which adjusts the transmission speed ratio in accordance with a ratio command, a method of operation which defines an outer servo loop for bringing the actual transmission speed ratio into correspondence with a desired speed ratio, the method comprising the steps of:

computing the transmission speed ratio error $E_r$ according to the expression where $R_d/R_a$, where $R_d$ is the desired speed ratio and $R_a$ is the actual speed ratio, the speed ratio error $E_r$ thereby corresponding to the factor f by which it is desired to change the transmission speed ratio; and repeatedly for a predetermined number n of times thereafter determining a ratio command $R_{cmd}$ according to the product of the actual speed ratio $R_a$ and a ratio step factor $R_s$, the step factor being determined substantially according to the expression $R_s = (E_r)^{1/n}$; and supplying the inner servo loop with a ratio command $R_{cmd}$, whereby the time required to change the ratio by any given factor f is substantially the same.

2. For a continuously variable ratio transmission having an inner servo loop which adjusts the transmission speed ratio in accordance with a ratio command $R_{cmd}$, and a mechanism for providing a periodically updated indication of the transmission desired speed ratio $R_d$, a method of operation for bringing the actual speed ratio $R_a$ into correspondence with the desired speed ratio $R_d$, the method comprising the steps of:

computing the speed ratio error $E_r$ at each update of the desired speed ratio $R_d$ substantially according to the expression: $E_r = R_d/R_a$; and for each computation of the ratio error $E_r$, obtaining n successive samples of the actual speed ratio $R_a$, determining a ratio command $R_{cmd}$ in relation to the product of the actual ratio $R_a$ and a ratio step factor $R_s$ for each sample of the actual speed ratio $R_a$, the step factor being determined substantially according to the expression $R_s = (E_r)^{1/n}$, and applying the ratio command $R_{cmd}$ to the inner servo loop, thereby to provide a system time response characteristic wherein the time required to change the ratio by any given factor is substantially the same.

3. For a vehicle drive train having a continuously variable transmission and a control mechanism which adjusts the transmission speed ratio in accordance with a ratio command, control apparatus comprising:

means including a computer based control unit for (1) determining a desired transmission speed ratio in accordance with vehicle operating parameters, (2) determining the ratio error of the actual speed ratio relative to the desired speed ratio as an indication of the factor f by which it is desired to change the actual ratio, and (3) computing a ratio step factor in relation to the nth root of said ratio error, where n is the number of corrective steps to be employed in effecting the desired ratio change, and thereafter generating n successive ratio commands for the control mechanism, each such ratio command being generated according to the product of the actual speed ratio and said ratio step factor, thereby bringing the actual speed ratio into correspondence with the desired speed ratio in a time interval that is substantially the same for any factor f of ratio change.

* * * * *